(12) United States Patent
Missotten

(10) Patent No.: US 10,455,768 B2
(45) Date of Patent: Oct. 29, 2019

(54) COVER PLATE FOR A CLEAN GRAIN AUGER IN A CLEANING SYSTEM OF AN AGRICULTURAL HARVESTER

(71) Applicant: CNH Industrial America LLC, New Holland, PA (US)

(72) Inventor: Bart M. A. Missotten, Herent (BE)

(73) Assignee: CNH Industrial America LLC, New Holland, PA (US)

( * ) Notice: Subject to any disclaimer, the term of this patent is extended or adjusted under 35 U.S.C. 154(b) by 222 days.

(21) Appl. No.: 14/891,003

(22) PCT Filed: May 13, 2014

(86) PCT No.: PCT/EP2014/059682
§ 371 (c)(1),
(2) Date: Nov. 13, 2015

(87) PCT Pub. No.: WO2014/184153
PCT Pub. Date: Nov. 20, 2014

(65) Prior Publication Data
US 2016/0113203 A1 Apr. 28, 2016

(30) Foreign Application Priority Data

May 14, 2013 (BE) .................................. 2013/0338

(51) Int. Cl.
*A01D 17/02* (2006.01)
*A01F 12/46* (2006.01)
*A01F 12/44* (2006.01)

(52) U.S. Cl.
CPC .............. *A01F 12/46* (2013.01); *A01F 12/44* (2013.01); *A01F 12/446* (2013.01)

(58) Field of Classification Search
CPC ......... A01F 12/46; A01F 12/44; A01F 12/446
USPC ......................................... 460/114, 101, 901
See application file for complete search history.

(56) References Cited

U.S. PATENT DOCUMENTS

| | | | | | |
|---|---|---|---|---|---|
| 2,526,141 | A | * | 10/1950 | Knowiton | .............. A01D 45/30 56/126 |
| 2,774,210 | A | * | 12/1956 | Kay | ...................... A01D 41/14 198/513 |
| 3,224,177 | A | * | 12/1965 | Adee | ...................... A01D 82/00 56/1 |
| 3,683,602 | A | * | 8/1972 | Scarnato | .............. A01D 43/107 56/14.4 |

(Continued)

FOREIGN PATENT DOCUMENTS

GB 1281304 A 7/1972

*Primary Examiner* — Thomas B Will
*Assistant Examiner* — Mai T Nguyen
(74) *Attorney, Agent, or Firm* — Peter K. Zacharias; Patrick M. Sheldrake

(57) ABSTRACT

An agricultural harvester includes a chassis, a threshing system carried by the chassis, and a cleaning system carried by the chassis and positioned below the threshing system. The cleaning system includes one or more sieves, a clean grain auger positioned below at least one sieve, and a cover plate positioned above the clean grain auger. The cover plate has a front edge and a rear edge which each extend generally parallel to a lateral axis of the clean grain auger. The front edge and rear edge are each open to allow clean grain to pass therebelow to the clean grain auger.

14 Claims, 3 Drawing Sheets

(56) References Cited

U.S. PATENT DOCUMENTS

| | | | | |
|---|---|---|---|---|
| 4,539,798 | A * | 9/1985 | Klinner | A01D 43/102 56/16.4 R |
| 4,790,128 | A * | 12/1988 | Klinner | A01D 41/06 56/364 |
| 5,111,645 | A * | 5/1992 | Klinner | A01D 41/06 56/364 |
| 5,557,912 | A * | 9/1996 | Voss | A01D 41/06 56/130 |
| 5,830,062 | A * | 11/1998 | Schwinn | A01F 12/44 460/100 |
| 5,873,227 | A * | 2/1999 | Arner | A01D 41/1274 56/10.2 G |
| 6,158,201 | A * | 12/2000 | Pruitt | A01D 43/10 56/13.9 |
| 6,435,965 | B2 | 8/2002 | Visagie | |
| 6,508,050 | B1 * | 1/2003 | Krone | A01D 43/107 56/192 |
| 7,297,051 | B1 | 11/2007 | Schmidt et al. | |
| 7,841,931 | B2 * | 11/2010 | Straeter | A01D 75/282 460/101 |
| 8,997,445 | B2 * | 4/2015 | Koch | A01D 41/14 56/229 |
| 2013/0157732 | A1 * | 6/2013 | Kopriva | A01F 12/44 460/100 |
| 2014/0066145 | A1 * | 3/2014 | Bilde | A01F 12/446 460/91 |
| 2014/0080554 | A1 * | 3/2014 | Bilde | A01F 12/30 460/73 |

* cited by examiner

COVER PLATE FOR A CLEAN GRAIN AUGER IN A CLEANING SYSTEM OF AN AGRICULTURAL HARVESTER

This application is the US National Stage filing of International Application Serial No. PCT/EP2014/059682 filed on May 13, 2014 which claims priority to Belgian Application BE2013/0338 filed May 14, 2013, each of which is incorporated herein by reference in its entirety.

FIELD OF THE INVENTION

The present invention relates to agricultural harvesters such as combines, and, more particularly, to cleaning systems used in such combines.

DESCRIPTION OF THE RELATED ART

An agricultural harvester known as a "combine" is historically termed such because it combines multiple harvesting functions with a single harvesting unit, such as picking, threshing, separating and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. The cleaning system includes a cleaning fan which blows air through oscillating sieves to discharge chaff and other debris toward the rear of the combine. Non-grain crop material such as straw from the threshing section proceeds through a straw chopper and out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto the grain pan where they are transported to the cleaning system. Alternatively, the grain and finer non-grain crop material may also fall directly onto the cleaning system itself.

The cleaning system further separates the grain from non-grain crop material, and typically includes a fan directing an air flow stream upwardly and rearwardly through vertically arranged sieves which oscillate in a fore and aft manner. The air flow stream lifts and carries the lighter non-grain crop material towards the rear end of the combine for discharge to the field. Clean grain, being heavier, and larger pieces of non-grain crop material, which are not carried away by the air flow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger.

The clean grain auger is positioned below the lower sieve, and receives clean grain from each sieve and from the bottom pan of the cleaning system. The clean grain auger then augers the clean grain laterally sideways to a clean grain elevator, which in turn conveys the clean grain to a grain tank onboard the combine. It is desirable to provide a clean grain auger with a high output rate so that the auger does not act as a choke point below the cleaning system. One option is to increase the diameter of the clean grain auger to provide a higher output rate; however, this also increases the weight of the auger which may be undesirable. Another option is to increase the rotational speed of the auger, but this results in higher centrifugal forces on the grain, which may then fly away from the auger and thereby reduce the efficiency and output of the auger. Yet another option is to use more than one clean grain auger, but this again adds to the weight and expense of the cleaning system.

What is needed in the art is a cleaning system for an agricultural combine which has a high output rate, but does not add to the weight or expense of the cleaning system.

SUMMARY OF THE INVENTION

The present invention provides a cover plate for a clean grain auger which allows the auger to be rotated at a higher rotational speed, while at the same time being configured to continuously converge toward the clean grain auger to force clean grain into the auger.

The invention in one form is directed to an agricultural harvester, including a chassis, a threshing system carried by the chassis, and a cleaning system carried by the chassis and positioned below the threshing system. The cleaning system includes one or more sieves, a clean grain auger positioned below at least one sieve, and a cover plate positioned above the clean grain auger. The cover plate has a front edge and a rear edge which each extend generally parallel to a lateral axis of the clean grain auger. The front edge and the rear edge are each open to allow clean grain to pass therebelow to the clean grain auger.

The invention in another form is directed to a cleaning system for an agricultural combine harvester, including at least one sieve, a clean grain auger positioned below at least one sieve and having a lateral axis, and a cover plate positioned above the clean grain auger. The cover plate has a front edge and a rear edge which each extend generally parallel to the lateral axis of the clean grain auger, whereby clean grain can pass by both the front edge and rear edge to the clean grain auger.

The invention in yet another form is directed to a method of cleaning grain in an agricultural combine harvester, the combine harvester including a chassis, a threshing system carried by the chassis, and a cleaning system carried by the chassis and positioned below the threshing system. The method includes the steps of:

cleaning the grain by passing the grain through at least one oscillating sieve; and conveying the clean grain with a clean grain auger positioned below at least one sieve, the conveying step including the sub-steps of:

a) urging the clean grain into the clean grain auger using a cover plate positioned above the clean grain auger, the cover plate having a free front edge and a free rear edge which each extend generally parallel to a lateral axis of the clean grain auger; and b) allowing clean grain to pass by both the front edge and the rear edge to the clean grain auger.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
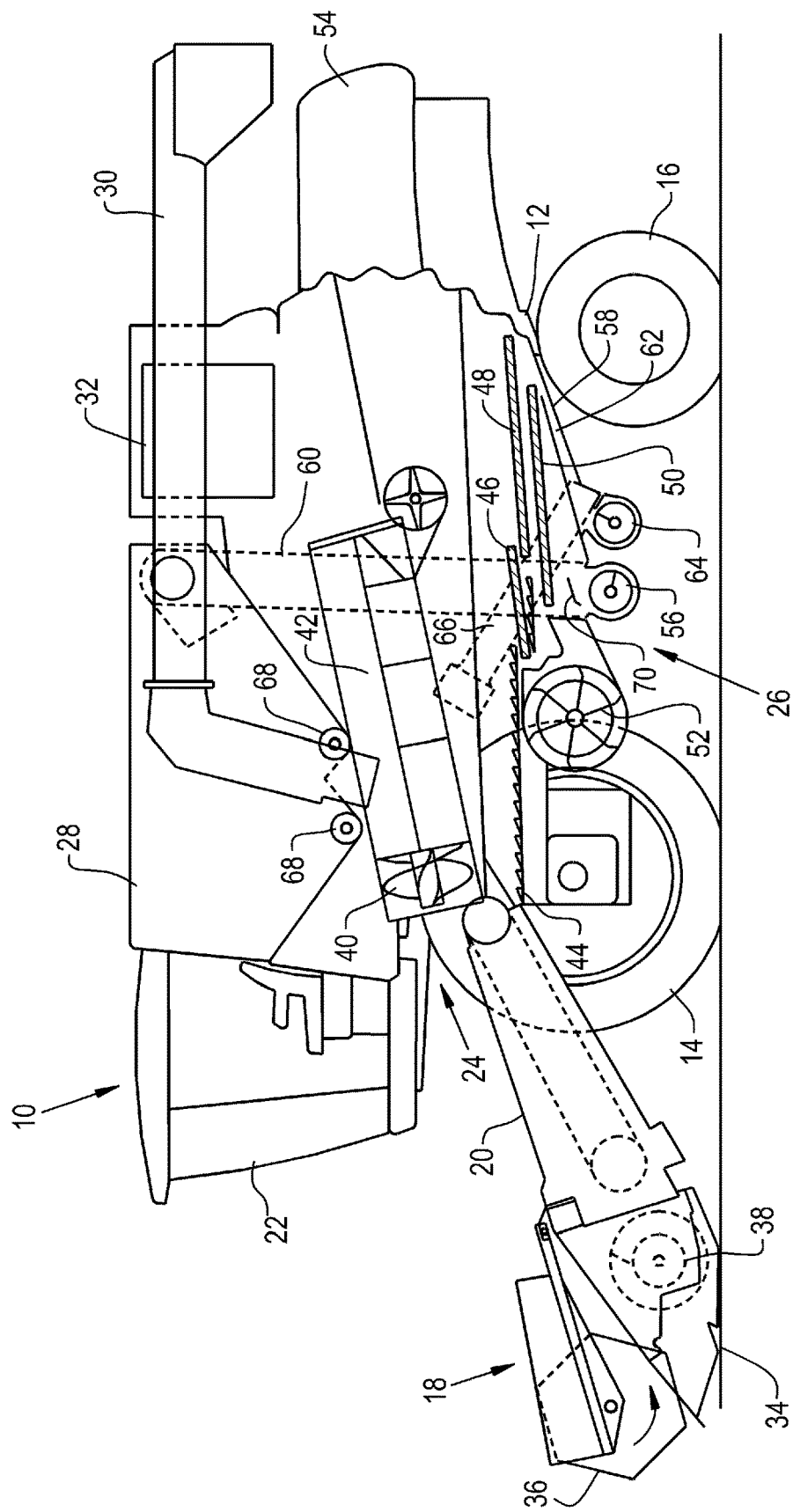
FIG. 1 is a side view of an embodiment of an agricultural harvester in the form of a combine which may include a cleaning system of the present invention.

Referring now to the drawings, and more particularly to FIG. 1, there is shown an agricultural harvester in the form of a combine 10, which generally includes a chassis 12, ground engaging wheels 14 and 16, header 18, feeder housing 20, operator cab 22, threshing and separating system 24, cleaning system 26, grain tank 28, and unloading auger 30.

Front wheels 14 are larger flotation type wheels, and rear wheels 16 are smaller steerable wheels. Motive force is selectively applied to front wheels 14 through a power plant in the form of a diesel engine 32 and a transmission (not shown). Although combine 10 is shown as including wheels, is also to be understood that combine 10 may include tracks, such as full tracks or half tracks.

Header 18 is mounted to the front of combine 10 and includes a cutter bar 34 for severing crops from a field during forward motion of combine 10. A rotatable reel 36 feeds the crop into header 18, and a double auger 38 feeds the severed crop laterally inwardly from each side toward feeder housing 20. Feeder housing 20 conveys the cut crop to threshing and separating system 24, and is selectively vertically movable using appropriate actuators, such as hydraulic cylinders (not shown).

Threshing and separating system 24 is of the axial-flow type, and generally includes a rotor 40 at least partially enclosed by and rotatable within a corresponding perforated concave 42. The cut crops are threshed and separated by the rotation of rotor 40 within concave 42, and larger elements, such as stalks, leaves and the like are discharged from the rear of combine 10. Smaller elements of crop material including grain and non-grain crop material, including particles lighter than grain, such as chaff, dust and straw, are discharged through perforations of concave 42. Threshing and separating system 24 can also be a different type of system, such as a system with a transverse rotor rather than an axial rotor, etc.

Grain which has been separated by the threshing and separating assembly 24 falls onto a grain pan 44 and is conveyed toward cleaning system 26. Cleaning system 26 may include an optional pre-cleaning sieve 46, an upper sieve 48 (also known as a chaffer sieve), a lower sieve 50 (also known as a cleaning sieve), and a cleaning fan 52. Grain on sieves 46, 48 and 50 is subjected to a cleaning action by fan 52 which provides an air flow through the sieves to remove chaff and other impurities such as dust from the grain by making this material airborne for discharge from straw hood 54 of combine 10. Grain pan 44 and pre-cleaning sieve 46 oscillate in a fore-to-aft manner to transport the grain and finer non-grain crop material to the upper surface of upper sieve 48. Upper sieve 48 and lower sieve 50 are vertically arranged relative to each other, and likewise oscillate in a fore-to-aft manner to spread the grain across sieves 48, 50, while permitting the passage of cleaned grain by gravity through the openings of sieves 48, 50.

Clean grain falls to a clean grain auger 56 positioned crosswise below and toward the front of lower sieve 50. Clean grain auger 56 receives clean grain from each sieve 48, 50 and from bottom pan 58 of cleaning system 26. Clean grain auger 56 conveys the clean grain laterally to a generally vertically arranged grain elevator 60 for transport to grain tank 28. Tailings from cleaning system 26 fall to a tailings auger trough 62. The tailings are transported via tailings auger 64 and return auger 66 to the upstream end of cleaning system 26 for repeated cleaning action. A pair of grain tank augers 68 at the bottom of grain tank 28 convey the clean grain laterally within grain tank 28 to unloading auger 30 for discharge from combine 10.

Figure 2:
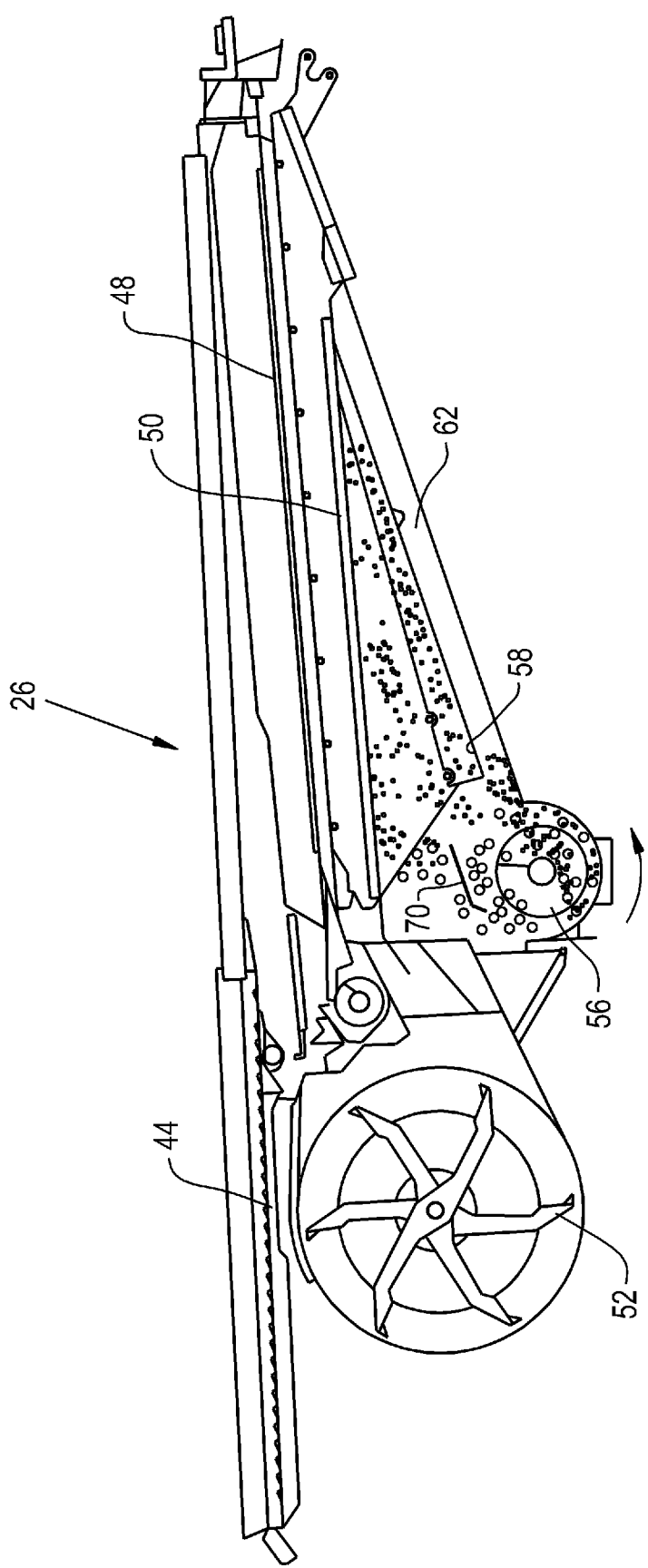
FIG. 2 is a side schematic illustration of a cleaning system used in the combine of FIG. 1.
Figure 3:
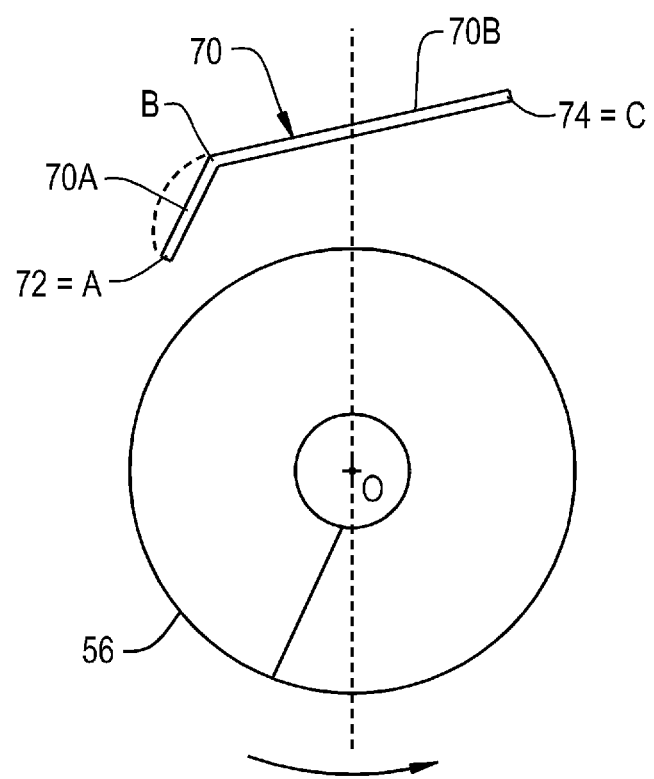
FIG. 3 is a schematic illustration of the clean grain auger and cover plate shown in the cleaning system of FIG. 2.

According to an aspect of the present invention, and referring now to FIGS. 2 and 3, a cover plate 70 is provided above clean grain auger 56. Cover plate 70 may include flanges at each longitudinal end thereof which are fastened to the sidewalls of cleaning system 26, such as with rivets, spot welding or the like. Cover plate 70 may also be structurally supported midway between the longitudinal ends, if needed.

Cover plate 70 also has a pair of lateral side edges and 72 and 74 which each extend generally parallel to a lateral axis of clean grain auger 56 (the lateral axis, referenced O in FIG. 3, corresponds to the axis of rotation of clean grain auger 56 and is termed the "lateral axis" since it is lateral to the travel direction of combine 10). Each of the lateral side edges 72 and 74 are open (i.e., free) to allow clean grain to flow past both sides of cover plate 70 to clean grain auger 56. An adequate spacing at the front lateral side edge 72 inhibits clean grain from entering into the area of fan 52, and an adequate spacing at rear lateral side edge 74 allows clean grain to flow from sieves 48, 50 and bottom pan 58 into clean grain auger 56. In the illustrated embodiment, lateral side edge 72 is a front edge with a minimum spacing of 10 mm from the exit of fan 52, and lateral side edge 74 is a rear edge with a minimum spacing of 30 to 50 mm from the forward edge of bottom pan 58.

Cover plate 70 has a non-planar cross section providing both a scooped configuration as well as structural rigidity. The scooped configuration progressively converges from back to front to urge the clean grain into clean grain auger 56. In the illustrated embodiment, cover plate 70 has a cross-section defined by two adjacent linear segments 70A and 70B with reference points defined at the front lateral side edge (denoted A in FIG. 3), at the intersection between the two linear segments 70A and 70B (denoted B), and at the rear lateral side edge (denoted C). The distances from the lateral axis (O) of clean grain auger 56 are represented by the mathematical expression:

distance from O to A,
is less than—distance from O to B,
is less than—distance from O to C.

This mathematical relationship provides the converging scooped configuration, as described above. More specifically, in the illustrated embodiment, clean grain auger 56 has a diameter of 230 mm, the distance from O to A is about 152 mm, the distance from O to C is about 215 mm, and the distance from O to B is about half the distance between A and C (i.e., about 180 to 185 mm). However, these specific dimensions can vary depending on the application.

Rear edge 74 is positioned above the front edge of bottom pan 58 so that clean grain falling off of bottom pan 58 flows into clean grain auger 56. Rear edge 74 needs to be low enough so as not to interfere with the airflow from fan 52 that needs to pass through bottom sieve 50; however, rear edge 74 also needs to be above the forward edge of bottom pan 58.

Front edge 72 theoretically needs very little or no clearance relative to clean grain auger 56. However, from a practical view, foreign matter such as corncobs or the like may become trapped under cover plate 70, and therefore a clearance distance between front edge 72 and clean grain auger 56 is likely desirable. In the illustrated embodiment, front edge 72 has a clearance distance of at least approximately 25 mm relative to clean grain auger 56.

In the event that cleaning system 26 is a self-leveling cleaning system, clean grain auger 56 and cover plate 70 are preferably configured to remain stationary relative to chassis 12. Moreover, cover plate 70 is shown with a cross-section having two adjacent linear segments. However, cover plate 70 may have a cross-section with a different number of segments such as one or three. Moreover, cover plate 70 can also have a curved cross-sectional shape which continuously converges from back to front, or a combination of one or more linear segments and curves (such as shown by the dashed line configuration in FIG. 3). Further, the illustrated embodiment shows a single clean grain auger 56 with a cover plate 70 above the clean grain auger 56. However, it is also possible to use multiple clean grain augers 56, with a cover plate 70 over some or each of the clean grain augers 56.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An agricultural harvester, comprising:
   a chassis;
   a threshing system carried by said chassis; and
   a cleaning system carried by said chassis and positioned below said threshing system;
   said cleaning system comprising:
      at least one sieve;
      a bottom pan positioned below the at least one sieve for receiving a clean grain, the bottom pan having a forward edge;
      a cleaning fan;
      a clean grain auger positioned below said sieve and adjacent to the forward edge of the bottom pan, extending laterally sideways and defining a longitudinal axis, and configured for transporting the clean grain to a grain tank; and
      a cover plate positioned above said clean grain auger, said cover plate having a front edge and a rear edge which each extend generally parallel to the longitudinal axis of said clean grain auger, wherein said front edge and said rear edge are open to allow said clean grain to pass therebelow around the front edge and the rear edge to said clean grain auger, the front edge of the cover plate is positioned rearwardly of the cleaning fan and in front of the longitudinal axis of the clean grain auger, the rear edge of the cover plate is positioned above the forward edge of the bottom pan and behind the longitudinal axis of the clean grain auger, wherein said cover plate is non-planar with a scooped configuration that continuously converges from back to front toward the clean grain auger so that clean grain is directed from the bottom pan toward the clean grain auger and said cover plate forces said clean grain to remain in the clean grain auger as the clean grain auger is rotated at an increased rotational speed.

2. The agricultural harvester of claim 1, wherein said cover plate has at least two adjacent linear segments viewed in cross-section.

3. The agricultural harvester of claim 1, wherein said cover plate has two adjacent linear segments viewed in cross-section.

4. The agricultural harvester of claim 3, wherein said cover plate has points defined on said cross-section at said front edge, an intersection between said two linear segments, and said rear edge, and wherein distances from said longitudinal axis of the clean grain auger are represented by the mathematical expression:
   a distance from said longitudinal axis to said front edge,
   is less than—a distance from said longitudinal axis to the intersection between said linear segments,
   is less than—a distance from said longitudinal axis to said rear edge.

5. The agricultural harvester of claim 1, wherein each of said front edge and said rear edge of said cover plate are positioned above said clean grain auger.

6. A cleaning system for an agricultural combine harvester, comprising:
   at least one sieve;
   a bottom pan positioned below the at least one sieve for receiving a clean grain, the bottom pan having a forward edge;
   a cleaning fan;

a clean grain auger positioned below each said sieve and adjacent to the forward edge of the bottom pan, extending laterally sideways and having a longitudinal axis, and configured for transporting the clean grain to a grain tank; and a cover plate positioned above said clean grain auger, said cover plate having a free front edge and a free rear edge which each extend generally parallel to said longitudinal axis of said clean grain auger, wherein the front edge and the rear edge are open so that said clean grain can pass by each said front edge and said rear edge to said clean grain auger, the front edge of the cover plate is positioned rearwardly of the cleaning fan and in front of the longitudinal axis of the clean grain auger, the rear edge of the cover plate is positioned above the forward edge of the bottom pan and behind the longitudinal axis of the clean grain auger, wherein said cover plate is non-planar with a scooped configuration that continuously converges from back to front toward the clean grain auger so that clean grain is directed from the bottom pan toward the clean grain auger and said cover plate forces said clean grain to remain in the clean grain auger as the clean grain auger is rotated at an increased rotational speed.

7. The cleaning system of claim 6, wherein said cover plate has at least 2 adjacent linear segments viewed in cross-section.

8. The cleaning system of claim 6, wherein said cover plate has 2 adjacent linear segments viewed in cross-section.

9. The cleaning system of claim 8, wherein said cover plate has points defined on said cross-section at said front edge of said cover plate, an intersection between said 2 linear segments, and said rear edge of said cover plate, and wherein distances from said longitudinal axis of the clean grain auger are represented by the mathematical expression:

a distance from said longitudinal axis to said front edge,
is less than—a distance from said longitudinal axis to the intersection between said linear segments,
is less than—a distance from said longitudinal axis to said rear edge.

10. The cleaning system of claim 6, wherein each of said front edge and said rear edge of said cover plate are positioned above said clean grain auger.

11. A method of cleaning grain in an agricultural combine harvester, the combine harvester including a chassis, a threshing system carried by the chassis, and a cleaning system carried by the chassis and positioned below the threshing system, said method comprising the steps of:

cleaning the grain by passing the grain through at least one oscillating sieve to a bottom pan positioned below the oscillating sieve for receiving a clean grain, the bottom pan having a forward edge;

conveying the clean grain with a clean grain auger positioned below said sieve and adjacent to the forward edge of the bottom pan, said clean grain auger extending laterally sideways and defining a longitudinal axis, and being configured for transporting clean grain to a grain tank, said conveying step including the sub-steps of:

a) urging the clean grain into said clean grain auger using a cover plate positioned above said clean grain auger, said cover plate having a free front edge and a free rear edge which each extend generally parallel to the longitudinal axis of said clean grain auger, the front edge and the rear edge are open, the front edge of the cover plate is positioned in front of the longitudinal axis of the clean grain auger, the rear edge of the cover plate is positioned above the forward edge of the bottom pan and behind the longitudinal axis of the clean grain auger, said cover plate is non-planar with a scooped configuration that continuously converges from back to front toward the clean grain auger so that clean grain is urged from the bottom pan toward the clean grain auger by the scooped configured of the cover plate;

b) allowing clean grain to pass by each of said front edge and said rear edge to said clean grain auger; and c) forcing clean grain which has fallen into the clean grain auger to remain in the clean grain auger; and increasing a rotational speed of the clean grain auger.

12. The method of cleaning grain of claim 11, wherein said rear edge is positioned above said front edge such that clean grain is progressively urged toward said clean grain auger.

13. The method of cleaning grain of claim 11, wherein said cover plate has 2 adjacent linear segments viewed in cross-section.

14. The method of cleaning grain of claim 13, wherein said cover plate has a cross section with points defined on said cross-section at said front edge, at an intersection between said 2 linear segments, and at said rear edge, and wherein distances from said longitudinal axis of the clean grain auger are represented by the mathematical expression:

a distance from said longitudinal axis to said front edge,
is less than—a distance from said longitudinal axis to the intersection between said linear segments,
is less than—a distance from said longitudinal axis to said rear edge.

* * * * *